United States Patent
Bloom et al.

(10) Patent No.: US 6,332,194 B1
(45) Date of Patent: *Dec. 18, 2001

(54) METHOD FOR DATA PREPARATION AND WATERMARK INSERTION

(75) Inventors: Jeffrey A. Bloom, Plainsboro; Ingemar J. Cox, Lawrenceville; Matthew L. Miller, Princeton, all of NJ (US)

(73) Assignee: Signafy, Inc., Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,431

(22) Filed: Jun. 5, 1998

(51) Int. Cl.$^7$ .................................................. H04L 9/00
(52) U.S. Cl. ......................... 713/176; 380/201; 380/217; 382/100; 382/232
(58) Field of Search ............................. 380/28, 5, 54–55, 380/200–203; 382/100, 232; 713/100, 176; 283/73, 113, 17; 375/100, 240, 25, 240.21

(56) References Cited

U.S. PATENT DOCUMENTS

| | | | |
|---|---|---|---|
| 4,939,515 | 7/1990 | Adelson | 341/51 |
| 5,530,751 | 6/1996 | Morris | 380/202 |
| 5,530,759 | 6/1996 | Braudaway et al. | 380/54 |
| 5,636,292 | 6/1997 | Rhoads | 382/232 |
| 5,646,997 | 7/1997 | Barton | 713/176 |
| 5,664,018 | 9/1997 | Leighton | 380/54 |
| 5,687,191 | 11/1997 | Lee et al. | 375/216 |
| 5,687,236 | 11/1997 | Moskowitz et al. | 380/28 |
| 5,710,834 | 1/1998 | Rhoads | 382/232 |
| 5,721,788 * | 2/1998 | Powell et al. | 382/100 |
| 5,734,752 | 3/1998 | Knox | 382/212 |

(List continued on next page.)

FOREIGN PATENT DOCUMENTS

WO 96/21290   7/1996   (WO).

OTHER PUBLICATIONS

Cox et al. Secure Spread Spectrum Watermarking for Multimedia. IEEE Trans. on Image Processing, 6, 12, 1673–1687, 1997.*

Christoph Dautzenberg, Watermarking images, Trinity College Dublin, Oct. 1994, 99. 1–22.

Koch, et al., Towards Robust and Hidden Image Copyright Labeling.

*Primary Examiner*—Gail Hayes
*Assistant Examiner*—Ho S. Song
(74) *Attorney, Agent, or Firm*—Scully, Scott, Murphy & Presser

(57) ABSTRACT

A method for data preparation and watermark insertion. The method includes the step of preparing the data at a first time by manipulating at least one set of the data characteristics for subsequent insertion of a first watermark. In a preferred embodiment of the method of the present invention the method further includes the step of inserting the first watermark by manipulating the set of data characteristics at a second time subsequent to the first time. In still yet another preferred embodiment of the method of the present invention, the method further includes the step of inserting a second watermark at a third time, before, during, or after the first time, by manipulating at least one set of the data characteristics. In a variation of the present invention a method for inserting a watermark into compressed data is provided. The compressed data has sets of data characteristics. The method includes the steps of inserting a watermark by manipulating the set of data characteristics; and optimizing the manipulated data by modifying the compressed data characteristics subject to a set of constraints.

37 Claims, 4 Drawing Sheets

U.S. PATENT DOCUMENTS

| | | | |
|---|---|---|---|
| 5,748,783 | 5/1998 | Rhoads | 382/232 |
| 5,790,703 | 8/1998 | Wang | 382/212 |
| 5,809,139 * | 9/1998 | Girod et al. | 380/5 |
| 5,825,892 * | 10/1998 | Braudaway et al. | 380/51 |
| 5,875,249 * | 2/1999 | Mintzer et al. | 380/54 |
| 5,905,800 * | 5/1999 | Moskowitz et al. | 380/28 |
| 5,915,027 * | 6/1999 | Cox et al. | 380/54 |
| 6,037,984 * | 3/2000 | Isnardi et al. | 375/240.21 |
| 6,101,602 * | 8/2000 | Fridrich | 713/176 |

* cited by examiner

METHOD FOR DATA PREPARATION AND WATERMARK INSERTION

BACKGROUND OF THE INVENTION

1. Field of the Invention

The present invention relates generally to preventing unlawful copying of audio, video and other media that can be digitized and, more particularly, to a method for inserting a watermark into digitized data.

2. Prior Art

Methods are known to insert a watermark into an image or audio or video data. One purpose of such a watermark is for copy generation management, e.g. Allowing a single generation of copies to be made from a master, but no subsequent copies to be made from the first generation copies.

In such an application, there are three states that must be represented "copy never", "copy once" and "copy no more". The "copy never" state is intended to prohibit any copying of the content. The "copy once" state is intended to permit a single generation of copying. As such, this one generation copy must have its state changed from the original "copy once" to the "copy no more" state.

The copy generation management can be implemented in a variety of ways. One solution is to use two different watermarks to encode the states "copy never" and "copy once" in the original material. Then, when a copy is made, an additional watermark is inserted that indicates the state "copy no more". Several variations of this method are possible. First, the "copy once" watermark may be removed prior to the insertion of the "copy no more" watermark. In practice, this is probably unnecessary since more than one watermark can co-exist in the data. Also, if the watermark is easily removable, then it may be straightforward to circumvent the copy generation management system by simply removing the "copy once" watermark from the content. Content with no watermark is assumed to be freely Copiague.

Second, the "copy once" state may be represented by the existence of two watermarks. One watermark would be difficult to remove and, when detected in isolation, would represent the "copy no more" state. The second watermark would be easy to remove and would only have meaning when detected in conjunction with the "copy no more" watermark, detection of both watermarks would represent the "copy once" state. An advantage of this approach is that, if carefully designed, the fragile watermark would be automatically removed by the existing installed base of VHS tape recorders. Note, however, that the fragile watermark must still survive signal processing that is common to video post production and transmission, e.g. low pass filtering, color correction and MPEG-2 compression.

Watermarks are typically inserted as noise in the digital signal during the production stage. The insertion of the watermark can be accomplished by many different procedures known in the art. The watermark, although inserted as noise, must be invisible to human perception or the image quality will suffer. Thus watermarks inserted at the production stage are image dependent and require great computational effort to ensure that the watermark will be invisible but robust enough so that it will survive post signal processing.

Once inserted, it is necessary to detect the presence of the watermark at a subsequent time. A typical method for determining the presence of a watermark in suspect data is to compare some characteristic of the data or signal derived from the data characteristics to a target watermark pattern. The watermark is determined to be present if this comparison indicates sufficient similarity.

A typical method of the prior art for watermarking data is illustrated in FIG. 1. FIG. 1 shows three similar data sets and, above each, the signal that would be derived from the data characteristics during detection. To the original data 1 a watermark pattern 2 is added. The sum of these two signals is the watermarked data 3. During the detection process a signal derived from data characteristics 6 is extracted from the watermarked data 3 and compared to a target watermark pattern 5. The watermarked data 3 is the sum of the original data 1 and the watermark pattern 2. This may be a predetermined linear or non-linear combination. The signal derived from the data characteristics 6, in this example is a linear (or perhaps non-linear) combination of a signal derived from the original data 4 and the target watermark pattern 5. In general, the characteristics of the watermark and those of the original data will interact and thus the signal derived from the characteristics of the watermarked data 6 and that derived from the characteristics of the watermark 5 will not exactly match. The similarity of the signal derived from the characteristics of the watermarked data 6 and the signal derived from the characteristics of the watermark 5 indicates the likelihood that the data contains the watermark 2. Note that in this illustration, the signal derived from the characteristics of the watermarked data 6 is similar to the signal derived from the characteristics of the watermark 5 suggesting the watermark 2 is present in the watermarked data 3, but the signal derived from the original data 4 and the signal derived from the characteristics of the watermarked data 6 are dissimilar, indicating that the original data 1 does not yet contain the watermark 2.

Note that in FIG. 1, it is desirable for the watermarking process to generate watermarked data 3 such that the extracted signal 6 is maximally similar to the target watermark 5. In many cases this similarity is increased as the relative amplitude or strength of the watermark pattern 2, and thus the signal extracted from the data characteristics 5, is increased. The drawback to increasing the watermark strength is that this also tends to decrease the similarity between the watermarked and original data 3, 1, respectively. Generally, in the case where the data represents audio, video, or imagery, this similarity is judged by the human visual and auditory systems. Thus, increasing the watermark strength often leads to a loss of audio, video, or image quality.

A typical approach of the prior art to addressing these apparently contradictory concerns is to modify the watermark pattern such that when inserted at high enough strength for detection it introduces minimal perceptual degradation.

In view of the prior art, there is a need for a method for inserting a watermark into digitized data for copy generation management which can be done at the recorder stage and thus requires minimal computational effort and associated costs. There is also a need for a method which inserts a watermark of a significantly lower strength then previously used in the prior art that can be detected with high likelihood.

SUMMARY OF THE INVENTION

Therefore it is an object of the present invention to provide a method for data preparation and watermark insertion which requires a minimal computational effort at the recorder stage.

It is a further object of the present invention to provide a method for data preparation such that subsequent watermark insertion is inexpensive as compared to the methods of the prior art.

It is yet a further object of the present invention to provide a method for data preparation and watermark insertion which results in a watermark of a significantly lower strength, then previously done in the prior art, which can be detected with high likelihood.

It is still yet a further object of the present invention to provide a method for data preparation and watermark insertion for copy generation management which addresses all of the above objectives.

The method of the present invention differs from the typical approach in that not only is the watermark pattern carefully chosen to satisfy the tradeoff between high likelihood of detection and high perceptual similarity between watermarked and original data, but the method also modifies the characteristics and signals derived from the characteristics of the original data to reduce the interaction between the data characteristics and the watermark characteristics. This allows for a watermark of a significantly lower strength to be detected with high likelihood.

To achieve these advantages over the prior art, a method for data preparation and watermark insertion is provided. The method comprises the step of preparing the data at a first time by manipulating at least one set of the data characteristics for subsequent insertion of a first watermark. In a preferred embodiment of the method of the present invention the method further comprises the step of inserting the first watermark by manipulating the set of data characteristics at a second time subsequent to the first time. In still yet another preferred embodiment of the method of the present invention, the method further comprises the step of inserting a second watermark at a third time, before, during, or after the first time, by manipulating at least one set of the data characteristics.

In a variation of the present invention a method for inserting a watermark into compressed data is provided. The compressed data has sets of data characteristics. The method comprises the steps of inserting a watermark by manipulating the set of data characteristics; and optimizing the manipulated data by modifying the compressed data characteristics subject to a set of constraints.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Although this invention is applicable to numerous and various types of digitized data, it has been found particularly useful in the environment of digital video data and copy generation management. Therefore, without limiting the applicability of the invention to digital video data and copy generation management, the invention will be described in such environment.

The technique presented here is intended for an application in which two copy protection watermarks are inserted into image, audio, or video data. Prior to distribution, when ample computing resources may be available, the data is preprocessed for insertion of a watermark which will be referred to as the first watermark. While the data is preprocessed or prepared for insertion, the first watermark is not actually inserted at this time. Also prior to distribution, a second watermark may be added to the data. The second watermark is used to indicate to a consumer recording device such as digital versatile disk (DVD), digital video home system (VHS), digital audio tape (DAT) or recordable compact disk (CD-R) that no or one copies are allowed to be made. In the event that no copies are allowed, the recording device will prohibit such copies. In the event that one copy is allowed, the recording device will allow copying, but will insert the first watermark into the copy. In the event that the first watermark is already present, further copying is disallowed. The method of the present invention encompasses the preparing of the data for the first watermark, along with the preferable steps of, inserting the first watermark, inserting a second watermark, and inserting the first watermark specifically into compressed data.

Before describing the method of the present invention in detail the following overview of the three preferred steps of the present invention are discussed. In a preferred embodiment of the method of the present invention, the method comprises a first step of preparing the data at a first time by manipulating at least one set of the data characteristics for subsequent insertion of a first watermark, a second step of inserting the first watermark by manipulating the set of data characteristics at a second time subsequent to the first time, and a third step of inserting a second watermark at a third time, before, during, or after the first time, by manipulating at least one set of the data characteristics. These steps will now be discussed in detail below. However, it should be understood by someone skilled in the art that the first step alone is novel as compared to the prior art and that its combination with the next two steps is given by way of example only and not to limit the scope of the invention.

Preparation

A novel feature of the method of the present invention is the preparation of the data to be watermarked. The preparation allows for a watermark of low strength to be subsequently inserted such that the watermark can be detected with high likelihood.

Figure 1:
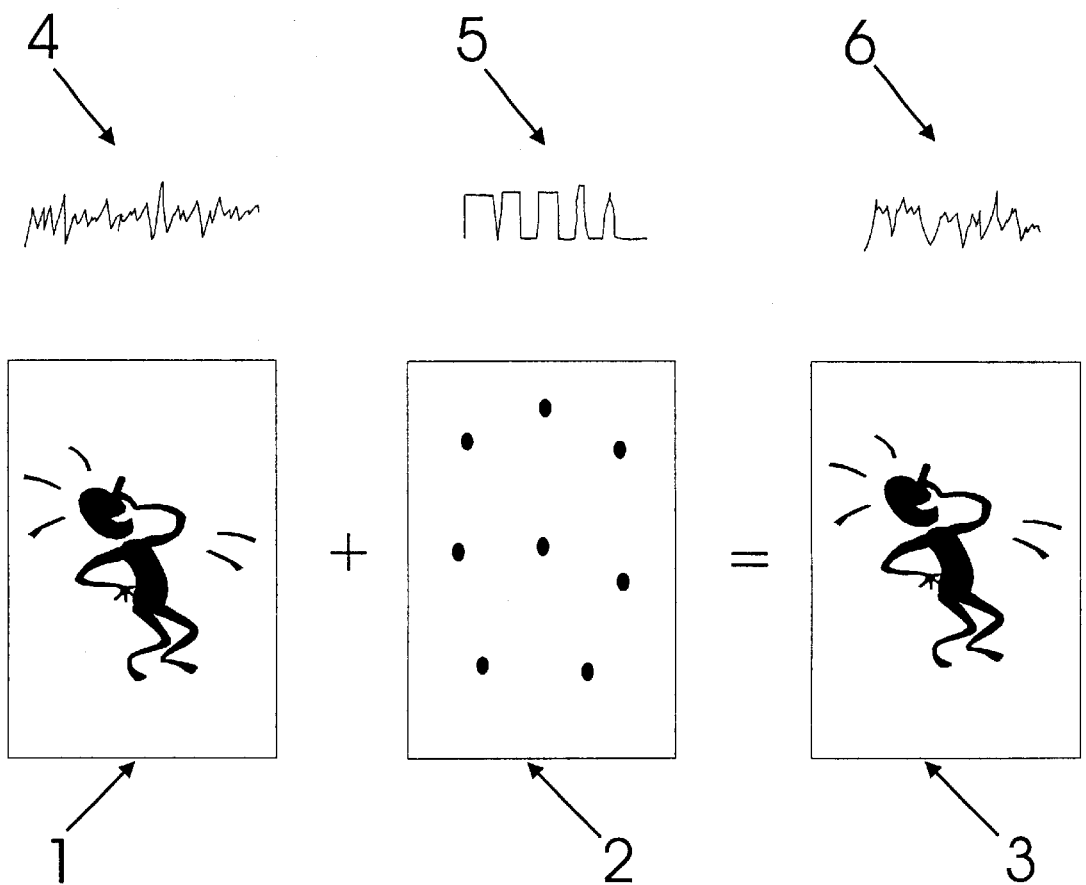
FIG. 1 illustrates a typical method of watermark insertion of the prior art.
Figure 2:
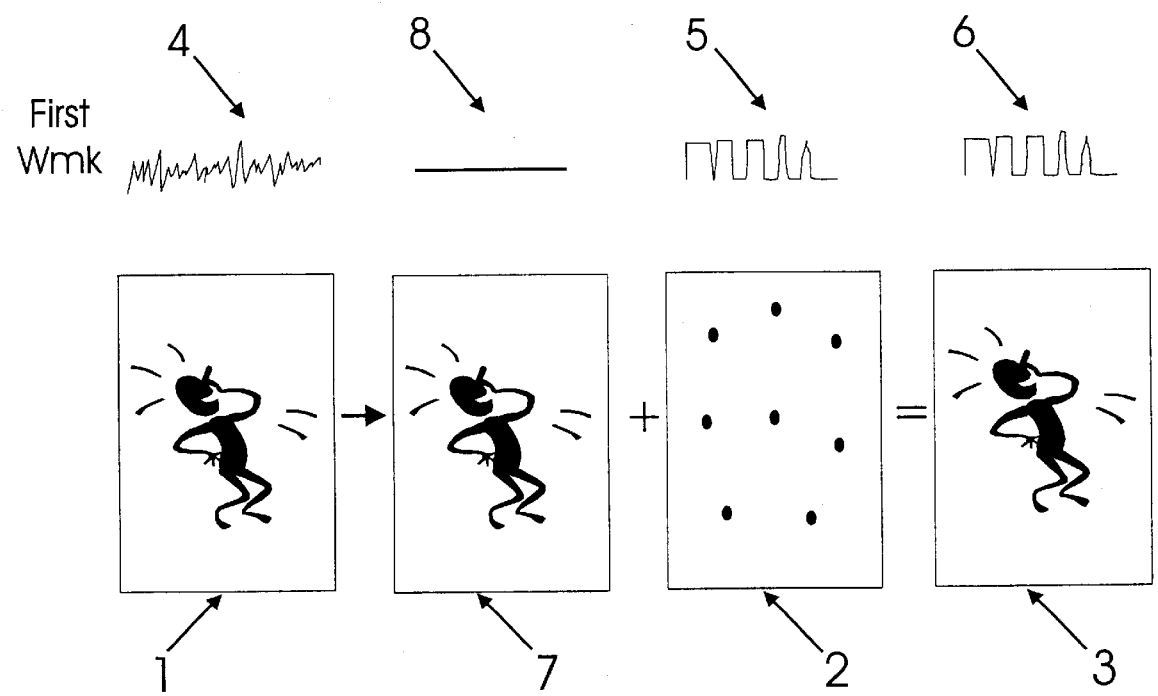
FIG. 2 illustrates the method of watermark preparation and insertion of the present invention.

Referring now to FIG. 2, there is illustrated the method of the present invention in which the original data is prepared for subsequent insertion of the first watermark. Instead of the watermark pattern 2, referred to as the first watermark, being added directly to the original data 1 as is done in the prior art, the watermark pattern 2 is added to a modified version 7 of the original data 1. The modification process that generates the modified version 7 from the original data 1 is called the preparation stage. The two important properties of the modified data set 7 are that it is perceptually similar to the original data 1 and the data characteristics or signal derived from the data characteristics 8 is maximally different from that of the watermark data 5.

In preferred applications of this invention, the original data may be audio, video, or still imagery. The set of data characteristics considered may be derived from the data in the spatial domain, the temporal domain, and/or a transformed domain. There are many transformed domains from which data characteristics can be derived. In the preferred implementation the data characteristics are derived from the data in both the spatial and the block DCT domains. Other local transform domains such as block Fourier transform, Hadamard transform, cortex transform, and wavelets as well as global transform domains such as the DCT and Fourier transform may be used. Spatial and temporal domain characteristic that can be used include sample value, edge features, color characteristics, textures, and phonemes.

The signals shown in FIG. 2, namely the signal derived from the characteristics of the original data 4, the signal derived from the characteristics of the watermark 5, the signal derived from the characteristics of the watermarked data 6, and the signal derived from the characteristics of the prepared original 8 are derived from the data characteristics. The data characteristics are mapped to some signal having measurable features that will serve as the basis of the comparison in the detection process. The modified version of the data 7, after preparation, will have a derived signal 8 that matches some criterion. In the preferred implementation, the criterion is minimum variance of the derived signal. In other words, we seek to make the derived signal as flat as possible. In general the data is modified such that the derived signal matches a target signal. Without loss of generality, this can be viewed as minimizing an error function, E, defined by equation 1:

$$E = S - T \quad (1)$$

where S is the derived signal 8, and T is the target signal. In the preferred implementation we can consider the target signal, T to be a constant.

Insertion of First Watermark

Once the data has been prepared as described above, the first watermark can be added. Again, referring to FIG. 2, the preparation step has modified the unwatermarked data such that a signal 8 derived from a set of data characteristics has a known form. Using an error function as described above to shape the data characteristics, the derived signal 8 is preferably flat, as discussed previously, with average value close to zero. The watermark pattern 2 is designed such that the signal 5 derived from the same set of characteristics, this time extracted from the watermark pattern, is significantly different and easily distinguishable from the flat, zero mean signal 8 derived from the prepared data. The amplitude or strength of the watermark pattern 2 relative to the prepared data 7 may be very small while the signal derived from the watermarked data 6 will be sufficiently similar to the signal derived from the watermark pattern 5 to indicate a positive detection decision.

Insertion of the first watermark involves a modification of the unwatermarked data such that a set of data characteristics, or a signal derived from a set of data characteristics, will closely match a known watermark signal, alternately referred to as a signal derived from a set of characteristics of a watermark pattern. The set of data characteristics considered may be derived from the data in the spatial domain, the temporal domain, and/or a transformed domain. There are many transformed domains from which data characteristics can be derived. In the preferred embodiment, the data characteristics are derived from the data in both the spatial and the block DCT domains. Other local transform domains such as block Fourier transform, Hadamard transform, cortex transform, and wavelets as well as global transform domains such as the DCT and Fourier transform may be used. Spatial and temporal domain characteristic that can be used include sample value, edge features, color characteristics, textures, and phonemes. In the spatial, temporal, and transformed domains the two step insertion process can reduce to the addition of a fixed pattern to the data. This reduction in complexity occurs because the data dependent, adaptive computations which are involved in typical watermark insertion (dependence on data characteristics discussed above) have been incorporated in the preparation stage. In the preferred embodiment the data characteristic used is an average of many block DCT coefficients from various locations in the data. The insertion step may also be performed in a compressed domain. Examples of common video compression techniques in which this method is applicable are MPEG, MEPG2, H.261, and H.263. JPEG is a good example of a still image compression technique in which the watermark preparation and insertion method of the present invention is applicable. In general, these compression techniques involve block DCT transformation of images or image frames (intracoding) or difference images (intercoding). In the later case the differences are typically between two video frames adjacent in time where one or both may be original frames or approximations to original frames. These compression techniques also contain a final, lossless entropy coding step. In general, the compressed data must be entropy decoded prior to watermark insertion. Some compression techniques allow for compressed frames in which both intra and inter coded blocks are present. The first watermark described is preferably inserted only into the intracoded blocks.

Figure 3:
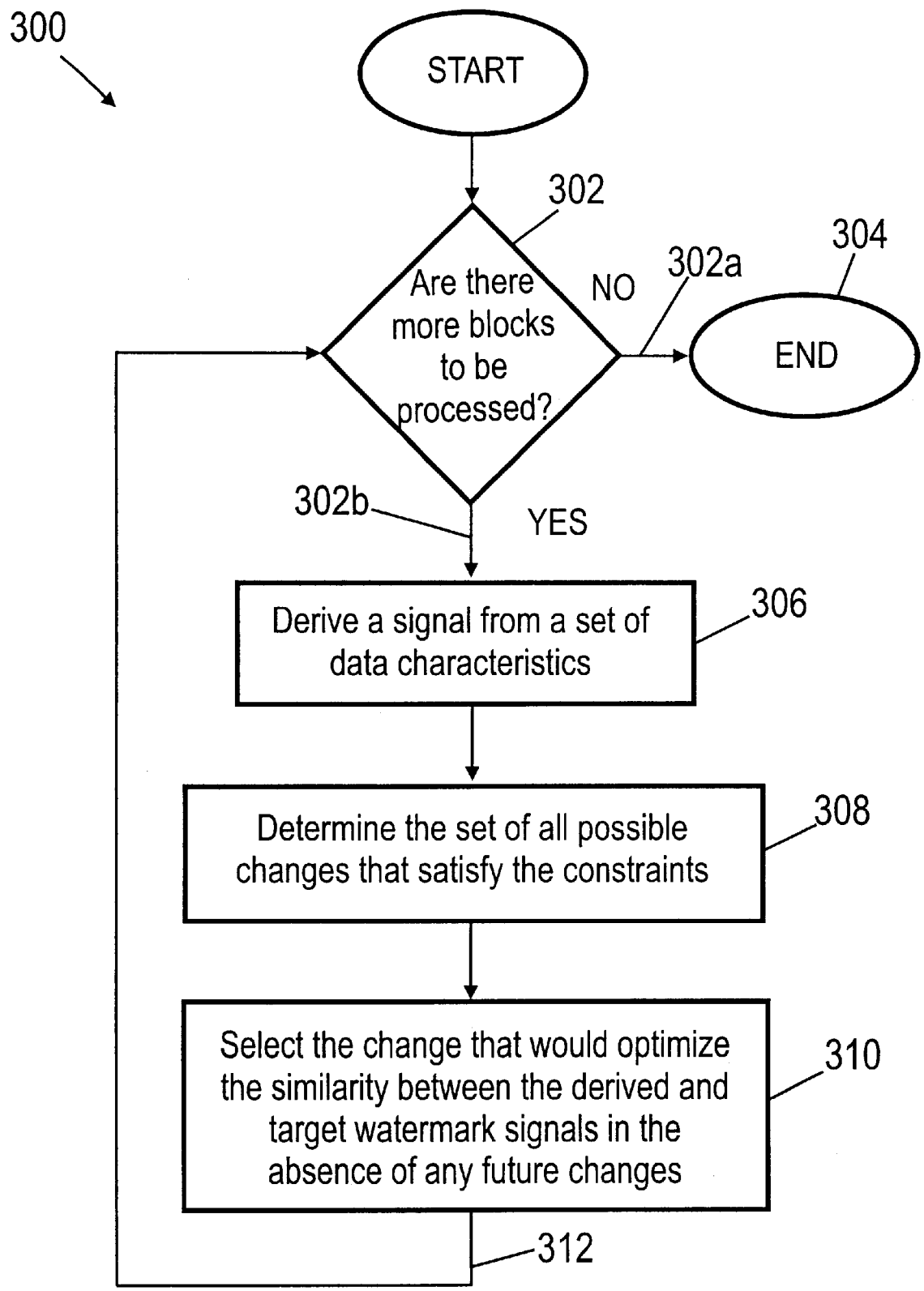
FIG. 3 illustrates a flow chart generally outlining the steps of the present invention in the context of compressed data which iterates over all intracoded blocks.

Referring now to FIG. 3, there is illustrated a method of insertion of a first watermark into compressed data, the method generally referred to by reference numeral 300. The insertion into compressed data is a process in which each intracoded block is examined and modified. This modification is made to optimize the similarity of the watermark signal and the signal derived from the characteristics of the watermarked data under certain constraints, considering all changes made so far, and assuming no further changes will be made. Three important constraints are used. A fidelity constraint limits the maximum perceptual difference between the watermarked data and the prepared data. A bitrate constraint insures that the size of the compressed watermarked data does not differ from the compressed unwatermarked data. A level constraint restricts new watermarked values to be such that they will not be changed by subsequent quantization. Such quantization is usually required prior to reintroduction of the entropy coding.

In summary, method 300 comprises the steps of analyzing each block of the processed data at step 302. When all blocks have been analyzed, the method 300 proceeds along route 302a to step 304 where it terminates. If there exists any blocks not yet analyzed, the method 300 proceeds along route 302b to step 306 where a signal is derived from a set of data characteristics. At step 308 the method 300 determines the set of all possible changes that satisfy the constraints. At step 310 the change that would optimize the similarity between the derived signal and the target watermark in the absence of any future changes is selected. The method 300 then loops back to step 302 until all blocks have been analyzed.

It should be understood that the method as illustrated in FIG. 3 is given by way of example only, and not to limit the scope of the invention.

insertion of Second Watermark

The second watermark can be inserted at any time relative to the preparation or to insertion of the first watermark. The combination of the second watermark and the preparation for the first watermark allow for powerful applications. Typically the set of data characteristics chosen for the second watermark should be disjoint from that chosen for the first watermark to avoid interaction between the two watermarks or interaction between the preparation process (for the first watermark) and the second watermark. However non-disjoint sets can also be supported.

EXAMPLES

Copy Generation Management:

In a preferred embodiment of the present invention in which the watermarks are used in a copy generation management scheme, it is preferable to add an additional watermark at the time of recording rather than to remove a watermark. The additional watermark is the first watermark discussed previously, which is computationally easy to insert and thus low cost hardware and/or software is capable of doing so, such as consumer DVD and VHS recorders. The first watermark also must not degrade the image fidelity and, at the same time, must be robust to subsequent signal transforms, e.g. survive digital-to-analog and analog-to-digital conversion.

Insertion of the "copy once" watermark, referred to previously as the second watermark is computationally expensive since significant analysis of the image is performed to determine the perceptually important regions of the image. Thus, such an insertion procedure is not practical for the first watermark, yet the first watermark should have many of the characteristics of the more robust "copy once", second watermark. In this example, much of the computation associated with the first watermark is performed offline during the preparation stage, typically during production, such that a lightweight computational procedure can then be employed at the recorder i.e., the player stage, in order to insert the first watermark.

Specifically, the second watermark is inserted into a set of averaged frequencies in the image. During or after insertion of the second watermark, a disjoint set of average frequencies are flattened or prepared for the subsequent insertion of the first watermark.

This preparation uses the same procedure as the second watermark, i.e. sophisticated perceptual models may be employed to best determine how the averaged frequencies can be flattened. This procedure prepares the image for the subsequent insertion of the first watermark.

Insertion of the first watermark adds a unique watermark that represents the "copy-no-more" state. The strength of the first watermark is significantly less than that commonly used for the second watermark. This is because the first watermark does not need to override the "noise" present in the image. This noise, a function of the naturally occurring signal that is the image, has been eliminated during the pre-processing phase where it is set to zero.

The first watermark has the same basic structure as other watermarks, e.g., it is preferably a N-bit binary vector In the preferred embodiment N=64 however other values of N may be preferred to obtain higher data rates or lower computational costs.

Insertion of the First Watermark into a MPEG-2 Bitstream:

In a preferred example of the method of the present invention, an algorithm for inserting the first watermark directly into the DCT coefficients of an MPEG-2 stream is provided. The first watermark is inserted into intracoded blocks of an MPEG-2 layer. This may be the base layer of the MPEG-2 stream or an enhancement layer. This method can be applied to an MPEG-1 data stream as it qualifies as a valid MPEG-2 base layer. This watermark insertion method affects neither the overall bitrate nor the starting positions of the slices in the MPEG-2 stream. The detection process is the same as that for the first watermark that had been inserted directly into the baseband video and the same as that for the second watermark. Detection processes for detecting the presence of a watermark in digital data are well known in the art.

The goals of this technique are to insert the first watermark (increase the likelihood that it will be detected), maintain the overall bitrate and position of I-frames within the data stream, and control the strength of the first watermark for both detection and visibility.

The method can be explained as follows. The 8×8 intracoded blocks of an MPEG stream are stored in the discrete cosine transform (DCT) domain. The location of the block within the image and the location of each coefficient within the 8×8 block together specify to which, if any, watermark element that coefficient contributes. It is possible to predict the effect of an increase in a coefficient value on the correlation between the extracted and target watermarks. This effect may again be dependent on both the coefficient location within the 8×8 block and the block position within the image. It may also be dependent on the type of coding associated with the macroblock of which the current block is a member (field or frame based DCT). Alternatively, it is possible to predict which change, positive, negative, or none, will increase the correlation between the extracted and target watermarks. Based on this prediction, the image can be examined on a block-by-block basis and make coefficient changes which will increase the expected correlation. It is to be assumed that an increase in correlation will, in general, increase the correlation coefficient and thus the detection certainty.

This method maintains the bitrate by insuring that the position in the data stream of the start of each slice or group of macroblocks does not change. This is done by requiring that any changes made, use the same or fewer bits to encode. If fewer bits are used and the slice becomes shorter, bits are padded onto the end of the slice to restore the starting position of the next slice in the data stream. These extra bits can instead be used in the slice to allow coefficient changes that use more bits to encode. We track these extra bits or saved bits, increasing the count when a change decreases the required encoding bits and decreasing the count when a change increases the required encoding bits. The count of saved bits is not allowed to drop below zero. Thus, a change which increases the number of bits required for encoding is allowed only if there are enough bits saved from previous changes. At the end of the slice, the count of saved bits is reset to zero and those bits are padded into the data stream.

More specifically, MPEG stores the 63 AC coefficients of an intracoded block as run/value pairs, one pair for each non-zero coefficient. The value element of the pair refers to the signed magnitude of a non-zero coefficient. The run element refers to the number of zero valued coefficients directly preceding that non-zero coefficient. Each run/value pair is encoded with a unique binary code, called a variable length code (VLC). In order to maintain the bitrate, only non-zero coefficients are considered and possible changes are evaluated based on the lengths of the original VLC and of that which would be necessary to encode the modified run/value pair.

In addition to controlling the bitrate in the data stream, we wish to control the first watermark strength for detection and visibility. A stronger first watermark will be more detectable (increased likelihood of detection) but is also more likely to be visible. Within each block, the watermark strength is controlled for detection by a single value. This is the maximum amount of change allowed in the block. Once this maximum amount of change has been effected, no further changes are allowed.

The change within a block is distributed among the non-zero coefficients according to a frequency-based perceptual model. This is to control the visibility of the inserted first watermark. A frequency-based perceptual model is used to determine the relative insensitivity of the human visual system (HVS) to the 63 AC DCT coefficients in an 8×8 block. These relative insensitivities are referred to as slacks. These slacks are dependent on the type of coding associated with the macroblock of which the current block is a member (field or frame based DCT).

Figure 4:
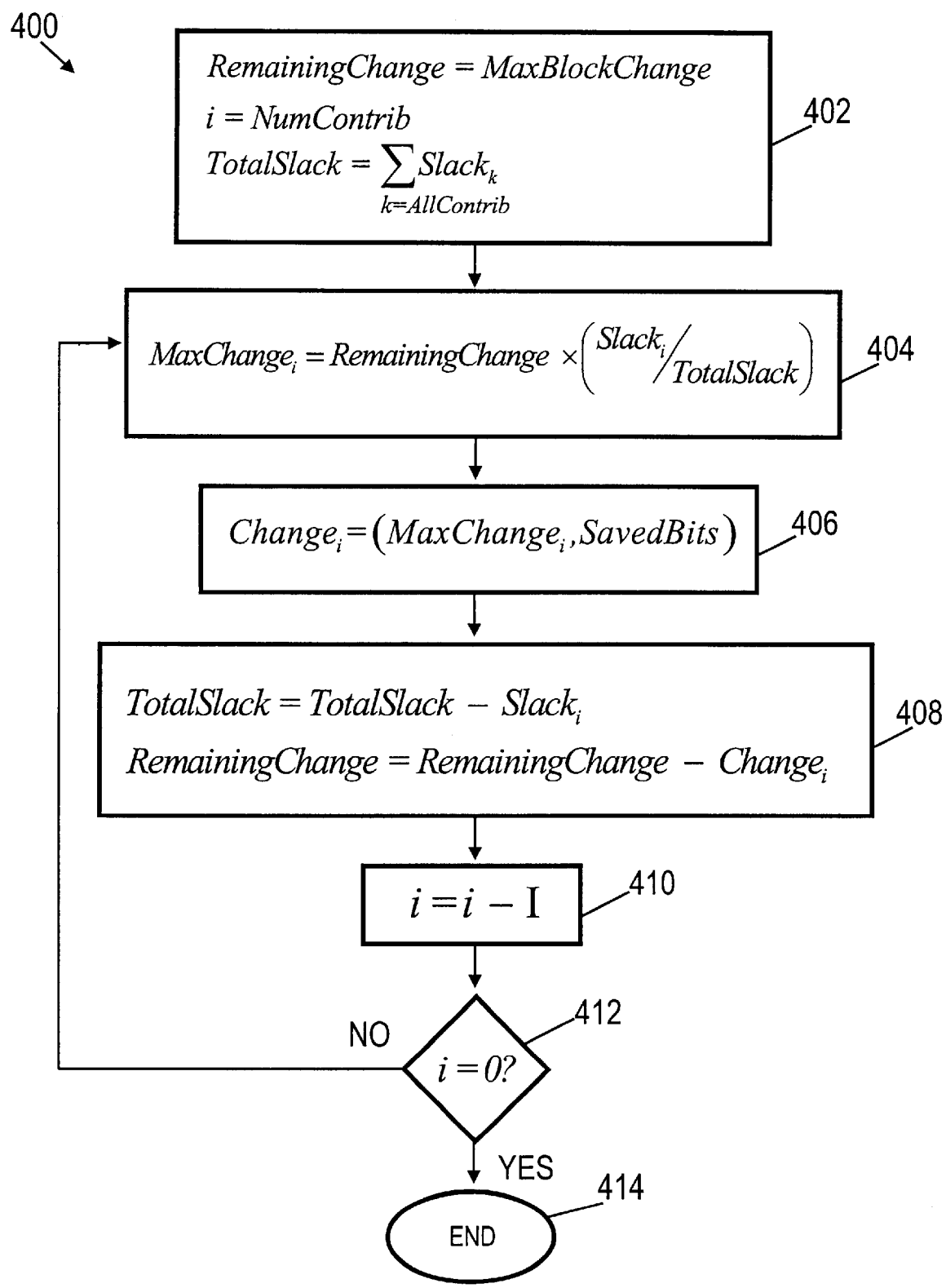
FIG. 4 illustrates a flow chart specifically outlining the steps of the present invention in the context of compressed data for each intracoded block iterated over all contributing coefficients.

Referring now to FIG. 4 there is illustrated a flow chart of the insertion method, referred to generally by reference numeral 400. MaxBlockChange refers to the strength for detection control as previously described. NumContrib is the number of non-zero AC coefficients for which a positive or negative change will increase the detected correlation. These coefficients are said to contribute to the correlation. Total-Slack is initialized as the sum of the slacks of all coefficients which contribute to the correlation at step 402. The method 400 loops over all contributing coefficients at steps 404 through 412 starting at the highest in the MPEG zig-zag scan order. The maximum change allowed for any coefficient is calculated at step 404 as the RemainingChange for the block weighted by the slack of that coefficient relative to the total remaining slack. The actual change is then found within the constraint of MaxChange and the constant bitrate constraint previously described. The function ConstBitRate effects this change and updates the SavedBits count at step 406. The TotalSlack is then updated at step 408 to represent the sum of the remaining slacks and the RemainingChange is updated, also at step 408, to represent the maximum amount the remaining contributing coefficients in the block may change. After all the contributing coefficients in the MPEG zig-zag scan order are processed the method 400 terminates at step 414.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for data preparation and watermark insertion, the data having sets of data characteristics, the method comprising the steps of:
   providing data to be watermarked;
   selecting a target signal;
   extracting a derived signal from a set of data characteristics;
   preparing the data at a first time to improve detectability of a subsequently inserted first watermark signal and/or reduce the complexity of the subsequent insertion of the first watermark signal by manipulating at least one set of the data characteristics such that the derived signal substantially matches the target signal; and
   inserting the first watermark by manipulating the set of data characteristics at a second time subsequent to the first time.

2. The method of claim 1, further comprising the step of inserting a second watermark at a third time, before, during, or after the first time, by manipulating at least one set of the data characteristics.

3. The method of claim 2, wherein the set of data characteristics manipulated for the second watermark are disjoint from the manipulated set of data characteristics for the first watermark.

4. The method of claim 3, wherein the set of data characteristics manipulated for the second watermark and the set of data characteristics manipulated for the first watermark are disjoint in a spatial domain and/or a temporal domain and/or a transformed domain.

5. The method of claim 1, wherein the data is a representation of an image.

6. The method of claim 1, wherein the data is a representation of audio.

7. The method of claim 1, wherein the data is a representation of video.

8. The method of claim 1, wherein the set of data characteristics are spatial domain characteristics.

9. The method of claim 8, wherein the spatial domain characteristics are chosen from a group consisting of pixel intensities, edge features color characteristics, and textures.

10. The method of claim 1, wherein the set of data characteristics are transformed domain characteristics.

11. The method of claim 10, wherein the transformed domain characteristics are chosen from a group consisting of DCT, block DCT, FFT, block FFT, wavelet, Hadamard transform, Cortex transform.

12. The method of claim 1, wherein the manipulating of the data characteristics is such that a signal is derived therefrom which substantially matches a pre-selected signal.

13. The method of claim 12, wherein the pre-selected signal has zero variance.

14. The method of claim 12, wherein the derived signal is performed by averaging subsets of the sets of data characteristics.

15. The method of claim 1, wherein the manipulating of the data characteristics is such that an error function is minimized.

16. The method of claim 15, wherein the error function is a measure of variance.

17. The method of claim 1, wherein the inserting step occurs in a spatial and/or time domain.

18. The method of claim 17, wherein the spatial and/or time domain characteristics are chosen from a group consisting of pixel intensities, edge features, color characteristics, textures.

19. The method of claim 1, wherein the inserting step occurs in a transformed domain.

20. The method of claim 19, wherein the transformed domain characteristics are chosen from a group consisting of DCT, block DCT, FFT, block FFT, wavelet, Hadamard transform, Cortex transform.

21. The method of claim 1, wherein the inserting step occurs in a compressed domain resulting in compressed data.

22. The method of claim 21, wherein the compressed domain is chosen from a group consisting of MPEG1, MPEG2, JPEG, Quicktime, H.261, H.263.

23. The method of claim 21, wherein the compressed data is video and the first watermark is inserted into only intra-coded portions of the compressed video data.

24. The method of claim 21, wherein the further manipulation includes an optimization procedure that modifies the compressed data characteristics subject to a set of constraints.

25. The method of claim 24, wherein the optimization procedure comprises the substeps of:

(i) obtaining a set of values from the compressed data;

(ii) determining a set of changes to the data that satisfy the set of constraints;

(iii) choosing a change from the set of changes that optimize detection of the watermark in the absence of any future changes; and (iv) repeating steps (i) through (iii) until all the compressed data is processed.

26. The method of claim 25, wherein the set of constraints comprises fidelity constraints.

27. The method of claim 25, wherein the set of constraints comprises bitrate constraints.

28. The method of claim 25, wherein the set of constraints comprises constraining each value in the compressed data to a known quantization level.

29. The method of claim 24, wherein the set of constraints comprises fidelity constraints.

30. The method of claim 24, wherein the set of constraints comprises bitrate constraints.

31. The method of claim 24, wherein the set of constraints comprises constraining each value in the compressed data to a known quantization level.

32. The method of claim 1, wherein the first time occurs prior to data distribution and wherein the first watermark is inserted into the data at the time the data is copied.

33. The method of claim 32, further comprising the step of prohibiting the copying of the data if the first watermark is present.

34. The method of claim 33, wherein the prohibiting step is implemented in a consumer recording device.

35. The method of claim 34, wherein the format of the recording device is chosen from a group consisting of DVD, DHVS, DAT, and CD-R.

36. The method of claim 1, wherein the set of data characteristics are time domain characteristics.

37. The method of claim 1, wherein the set of data characteristics are spatial and time domain characteristics.

* * * * *